Nov. 21, 1933.  G. S. LANE  1,936,240
FRICTION CLUTCH OR BRAKE
Filed July 10, 1929
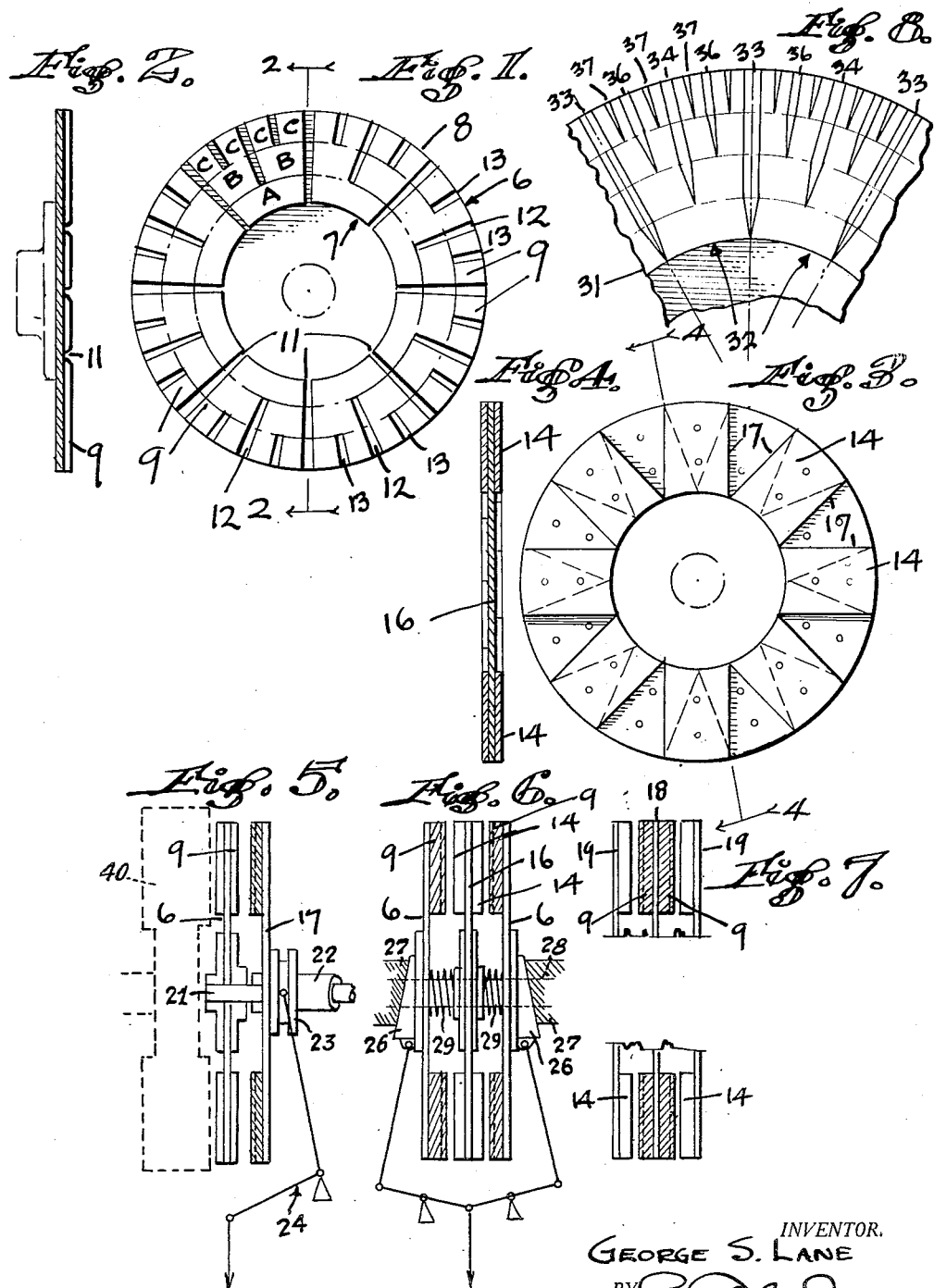
INVENTOR.
GEORGE S. LANE
BY
ATTORNEYS.

UNITED STATES PATENT OFFICE 1,936,240

FRICTION CLUTCH OR BRAKE

George S. Lane, San Anselmo, Calif., assignor to Wallace Sheehan, San Francisco, Calif., as trustee Application July 10, 1929. Serial No. 377,314

12 Claims. (Cl. 192—107)

The invention relates to friction discs for use in connection with friction clutches, and friction brakes, and the like.

In friction discs used in clutches, and brakes, and the like, points near the outer periphery of the discs travel on a longer path per revolution, than points nearer to the center of the disc. There is a larger area of contact near the outer periphery of the disc, than near the disc center, and this results in uneven wear on the friction face of the disc. Especially is this true in connection with brakes, where after comparatively short use the disc is worn unevenly to such an extent as to materially reduce the effective contact area, and the efficiency of the brake.

It is the primary object of my invention to provide a friction disc for clutches and brakes and the like which offers equal circumferential frictional area at all radial distances from the center of the disc.

Another object of the invention is to provide a friction disc having circumferentially spaced and radially disposed friction segments formed on a face thereof in such a manner that every arc described from the center of the disc across any portion of each of the segments passes over an equal area of friction surface, regardless of the radius of the arc, whereby the disc offers equal friction at all radial distances from the center thereof, in other words, the circumferential frictional area is the same at all radial distances from the disc center.

Another object of the invention is the provision of a hollow center disc, the friction face of which is divided into a plurality of segments so formed that each segment has the same surface area at all radial distances from the disc center.

Another object of the invention is the provision of a hollow center disc, the friction face of which is so divided that the frictional area included within every annulus of the same width drawn from the disc center, is the same, regardless of the mean radius of the annulus.

A further object of the invention is the provision of a disc which has a plurality of friction members raised beyond the plane of the disc face and arranged in spaced circumferential relation therearound, each member having the same friction area throughout any part of the width between the outer periphery and the innermost periphery thereof.

Another object of the invention is the provision of friction means for friction clutches or brakes, which friction means includes a plurality of discs, the friction surface of one or more discs having a plurality of friction segments formed thereon, arranged in such a manner as to offer equal circumferential frictional area at any radial distance from the disc centers; the face of the adjacent disc cooperating with the said segments, being smooth, or being formed in such manner as to obviate the accidental interlocking of the adjacent disc surfaces with each other, or being formed to offer equal friction surfaces; means being provided to move the discs into or out of engagement with each other.

Other objects and advantages are to provide a friction disc that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawing:

Fig. 1 is a front elevation of a disc constructed in accordance with my invention.

Fig. 2 is a cross section taken through Fig. 1, on the line 2—2.

Fig. 3 is a front elevation of a modified form of disc.

Fig. 4 is a section taken through Fig. 3 on the line 4—4.

Figs. 5, 6 and 7 are cross sections through modified forms of clutch or brake assemblies, constructed in accordance with my invention and illustrating the parts thereof diagrammatically.

Fig. 8 is a front elevation of a fragmentary portion of a disc constructed in accordance with my invention having a modified arrangement of slots or depressions formed therein.

In carrying out my invention I make use of a disc 6, hollow at the center thereof so as to form substantially a ring having an inner periphery 7 and an outer periphery 8. The disc 6 is made preferably of hard material and one face thereof is divided into friction segments 9 by a plurality of radial slots or recesses 11, which extend from the inner periphery 7 to the outer periphery 8 of the disc 6.

Inasmuch as the arc at the outer periphery of each segment 9 is the largest, and the arc at the inner periphery thereof is the smallest, such an arrangement would normally result in a larger circumferential friction area near the outer periphery of the disc than that at the inner periphery thereof. In order to equalize the width of the effective frictional area of the segments 9 at any radial distance from the disc center, portions of each segment are recessed or cut away in such a manner as to reduce the original frictional area of each segment in proportion with the increase of the width of the segments toward the outer periphery thereof. The area of the recessed or cut away portions varies at each radius in a certain ratio to the radial distance of the particular portion from the disc center. Consequently the slots 11 are not the same width thruout, they flare outwardly toward the outer periphery.

Intermediate the recesses or slots 11, another slot 12 is cut away from each segment 9. The slot 12 extends radially from the outer periphery 8 but is shorter than the slots 11. Between each long slot 11 and the shorter middle slot 12 is formed a radial slot 13, which is the shortest slot of the three. In the illustration I divide the disc in three annuli, and the length of the slots 12 is such as to extend to the outer periphery of the innermost annulus, or in other words the annulus having the smallest mean radius. The slots 13 extend from the outer periphery 8 of the ring or disc 6 to the outer circumference of the intermediate annulus. All the slots 11, 12 and 13 increase in width toward the outer periphery of the disc, whereby the effective circumferential friction area at each radial distance from the center is the same.

In Fig. 1 I indicate the segment within the innermost annulus by the letter A. The two portions of the effective frictional area of the segment within the intermediate annulus are designated by the letters B, while the four portions of the effective friction area of the segment in the outermost annulus are denoted by the letter C. The dimensions of these areas are such that the total effective friction area of the portions C, is equal with the sum of the area of the two portions B, and with the area of portion A. The same applies to the effective friction area in the segments within any annulus, of equal width, struck from the disc center with any mean radius.

The slots 11, 12 and 13 which divide the segments into said portions, may be cut into the friction disc, or they might be formed in the form of recesses cast, stamped, or pressed into the friction face of said disc. The edges of the recesses or slots 11, 12 and 13 must be rounded to prevent the interlocking of the friction face with another disc, with which the disc 6 cooperates, and to obviate any cutting by the slot edges.

The equal frictional surface heretofore described can be formed on both sides of the disc 6, when double friction action is required.

It is to be understood that the number and length of the recesses or slots in the friction face of a disc, may be made different from that shown, in accordance with the dimensions of the disc, and the friction required. In the present illustration the radius of the inner disc periphery 7 is half of the radius of the outer disc periphery 8.

Another embodiment of the friction disc is illustrated in Fig. 3, wherein segment blocks 14 are fixedly secured to a face of a disc 16. The blocks 14 are raised beyond the plane of the face of the disc 16 and are radially disposed in circumferentially spaced relation to each other. The edges 17 of each block 14 are parallel with the radius, in the direction of which the block is positioned.

If both faces of the disc 16 have such friction blocks 14 thereon, the blocks on one face are staggered relatively to the respective blocks 14 on the other face of the disc 16. The circumferential friction areas at radial distances from the disc center are equal, by reason of the parallelism of the block edges 17.

A disc 16 with the friction blocks 14 thereon may be advantageously used in connection with the disc 6, without any danger of interlocking. Thus, numerous combinations of equal and uniform friction surface discs may be arranged. Such combinations are illustrated in Figs. 5, 6 and 7.

In Fig. 6, is shown a diagrammatic view of a clutch or brake assembly. In the center is the disc 16, with blocks 14 on both faces thereof. In operative relation to each face of the disc 16 is mounted a disc 6, with the segments 9 formed by the recesses 11, 12 and 13, on the face thereof adjacent the respective face of the disc 16. This arrangement results in a single friction, double face clutch or brake.

Another arrangement, namely, a single friction, single face design, is illustrated in Fig. 5, wherein in the center is a disc 6, having friction segments 9 on one face thereof which coacts with a plain disc 17, or this disc 17 may be constructed similarly to disc 6. The disc 6, having the faces thereof corrected in accordance with my invention, would be confined between the disc 17 on one side thereof and a disc or fly wheel 40 on the other side. The combination of the fly wheel, disc 6, and disc 17 forms the essential elements of a clutch or brake.

A double friction, double face clutch or brake arrangement is shown in Fig. 7. In this embodiment a central disc 18 has segments 9 formed on both faces thereof, in the manner heretofore set forth. Opposite each face of the disc 18 is operatively disposed a disc 19 constructed similarly to the disc 16, with blocks 14 on the inner face thereof. While the single friction, single face design is used in clutches or brakes of plain thrust type in one direction, the single friction, double face, and the double friction, double face arrangements may be designed to operate without thrust bearings.

It is to be noted that the word disc as herein used includes not only circular planes, but also conical, or other type discs, that may be employed in clutches or brakes or the like. In case of conical discs, the slots or blocks will not be radial, but they will be proportioned and arranged so as to result in a substantially even friction surface throughout the disc surface.

The arrangement of the slots or spacing between the segments or blocks, or of the recessed, cut away portions of the disc surface may be refined to such an extent as to also provide for variance in friction resulting from the different velocity of the different points of the disc. The velocity of the different points of a disc varies in proportion with the radial distance of the points from the disc center. As velocity increases, friction, and correspondingly, the coefficient of friction, decreases. This would cause a slight difference between the coefficient of friction of points near the outer periphery and that of points near the inner periphery of the ring disc. The even friction throughout the disc therefore, may be very accurately determined, by shaping and flaring the recesses or slots and the edges of the segments, so that circumferential frictional, or contact surfaces, at different radial distances from the center, are not exactly equalized, but are slightly increased in proportion to the decrease of the coefficient of friction, due to increasing peripheral velocity. In the event of such a fine determination of even friction, the total area of portions C would be slightly larger than that of portions B; and the area of the two portions B would be slightly larger than that of portion A. Such an accurately even frictional surface is not required in practice in connection with brake linings, or softer metals, but such accuracy may be necessary when hard metal discs are used.

Any compressing means or actuating mechanism may be employed to move the discs into and out of operative relation. An embodiment of such disc actuating mechanism is illustrated in Fig. 5 and another in Fig. 6. In the embodiment of Fig. 5 the disc 6 is fixedly mounted on a shaft 21 and the disc 17 is slidable, but not rotatable, on a sleeve 22. A shift collar 23 is provided on the disc 17, to which is connected the usual actuating mechanism 24, indicated diagrammatically.

In the embodiment shown in Fig. 6, the outer discs 6 are moved toward the center disc 16 by means of wedges 26, which are slidably held in sleeves 27. The wedges are preferably so formed as to straddle the shaft 28 rotating in the sleeve. The central disc 16 is fixedly mounted on and rotates with the shaft 28. The outer discs 6 are urged away from the center disc 6, by springs 29, coiled around the shaft 28, one on each side of the disc.

Another arrangement of the recesses or slots for dividing the disc surface into segments is illustrated in Fig. 8. The ring disc 31 into this embodiment is divided in equal segments 32, by radial recesses or slots 33 extending from the inner to the outer periphery of the ring disc 31. This disc 31 is divided into four imaginary annuli of the same thickness. Intermediate the recesses 33 is a slot 34 extending from the outer periphery of the ring disc 31, to the outer circumference of the smallest annulus. Between each recess 33 and the middle slot 34 is a slot 36 extending radially from the outer periphery of the ring to the outer circumference of the annulus next to the smallest annulus. The space on each side of slots 36 is equally divided by the shortest slots 37 extending radially from the outer periphery of the ring disc to the inner circumference of the outermost annulus. All the recesses or slots 33, 34, 36 and 37, have parallel edges, but the inner ends of the slots taper at the outer circumference of the respective annulus and taper to a point on the inner circumference of the same annulus. The shortest slot 37 is tapering throughout the width of the outermost annulus.

The effective frictional area in each annulus therefore will be the same. The tapering ends of the slots in the respective annuli result also in an equal frictional area in any and all annuli of the same thickness. It is to be noted that the thickness of the slots differs in proportion to their length. The longest slot 33 is the thickest and the shortest slot 37 is the narrowest. The difference in thickness is gradual as shown

I claim:

1. A friction disc having a plane face and being provided with depressions on said face thereof around and between the center and circumference of the disc, said depressions being so arranged that every arc described around any portion of the face passes over an approximately equal area of the face, regardless of the mean radius of the arc from the center and of the depressions in the face.

2. A friction disc having a plane face and being provided with depressions on said face thereof around and between the center and circumference of the disc, said depressions being so arranged that every arc described around any portion of the face passes over an approximately equal area of the face, regardless of the mean radius of the arc from the center and of the depressions in the face in combination with discs to be contacted therewith; a second disc for frictional engagement with the first disc and means for placing said discs in frictional contact.

3. In combination, a pair of related complementary plates, each plate having the friction face thereof divided into a plurality of segments and each segment having substantially the same surface area adjacent the outer circumference thereof as at the inner circumference.

4. In combination, a pair of related complementary plates, each plate having the friction face thereof divided into a plurality of segments and each segment having substantially the same surface area adjacent the outer circumference thereof as at the inner circumference; means to hold one plate stationary; and means to move the other plate into engagement therewith.

5. In combination, a pair of related complementary plates, each plate having the friction face thereof divided into a plurality of segments and each segment having substantially the same surface area adjacent the outer circumference thereof as at the inner circumference; and means to move the plates into frictional engagement with each other.

6. In combination, a pair of related discs; one disc having a face thereof divided into a plurality of circumferential segments, each segment having substantially the same surface area adjacent the outer circumference thereof as at the inner circumference; the other disc having a plurality of parallel sided and radially disposed segments arranged in spaced circumferential relation on a face thereof; and means to move the discs into frictional engagement.

7. A hollow center friction disc having a face thereof provided with a plurality of friction segments raised beyond the plane of the disc face and arranged in spaced circumferential relation therearound; each segment being divided into outer, middle, and inner sections and having grooves extended radially from the periphery of the disc to the edge of the inner sections and grooves extended from the periphery of the disc to the edge of the middle sections whereby the combined surface areas of the respective divided outer, middle and inner sections are substantially the same.

8. A hollow center friction disc having a face thereof provided with a plurality of friction segments raised beyond the plane of the disc face and arranged in spaced circumferential relation therearound; each segment being divided into a plurality of sections between the periphery and center thereof, and having radially arranged grooves of graduated lengths in each of the segments, the longest grooves extending from the disc periphery to the edge of the section nearest the center, the second longest grooves extending from the disc periphery to the edge of the section occupying the second position out from the center, and the remaining grooves extending from the disc periphery to the edges of selected sections according to the length of said grooves and the positions occupied by the remaining sections relative to the center whereby the combined surface areas of the respective divided sections are substantially the same.

9. A friction disc provided with circumferentially spaced and radially disposed friction segments on a face thereof, said segments being integral with the disc, the area of said friction segments being equal on the circumference of every circle drawn thru said segments from the center of the disc.

10. A friction plate having a face thereof divided into a plurality of friction segments arranged in spaced circumferential relation therearound, the distance across diametrically opposite inner ends of any of said segments being one half the distance across diametrically opposite outer ends of any of said segments, each segment having grooves extended radially inward from the plate periphery predetermined distances, whereby every arc struck from the plate center across any portion of each of the segments passes over an equal area of friction surface.

11. A friction plate having a face thereof divided into a plurality of friction segments arranged in spaced circumferential relation therearound, the distance across diametrically opposite inner ends of any of said segments being one half the distance across diametrically opposite outer ends of any of said segments, each segment having grooves extended radially inward from the plate periphery predetermined distances, whereby every arc struck from the plate center across any portion of each of the segments passes over an equal area of friction surface; a plate to be engaged with said first mentioned plate for friction creating purposes; and means for placing said plates in contacting engagement.

12. A friction plate having a face thereof divided into a plurality of annuli, and each annulus having a portion of the face thereof removed to produce equal friction surfaces on all said annuli.

GEORGE S. LANE.